(12) United States Patent
Jin

(10) Patent No.: US 10,656,095 B2
(45) Date of Patent: May 19, 2020

(54) SYSTEMS AND METHODS FOR WAVELENGTH SPECTRUM ANALYSIS FOR DETECTION OF VARIOUS GASES USING A TREATED TAPE

(75) Inventor: Peng Jin, Bartlett, IL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 13/024,022

(22) Filed: Feb. 9, 2011

(65) Prior Publication Data

US 2012/0202294 A1     Aug. 9, 2012

(51) Int. Cl.
*G01N 21/84* (2006.01)

(52) U.S. Cl.
CPC .................. *G01N 21/8483* (2013.01)

(58) Field of Classification Search
None
See application file for complete search history.

(56) References Cited

U.S. PATENT DOCUMENTS

| | | | |
|---|---|---|---|
| 2,487,077 | A | 11/1949 | Shepherd |
| 3,920,402 | A | 11/1975 | Afanasiev et al. |
| 5,477,322 | A | 12/1995 | Webster |
| 5,758,644 | A * | 6/1998 | Diab et al. .................. 600/323 |
| 6,322,750 | B1 | 11/2001 | Barclay |
| 6,947,138 | B2 | 9/2005 | Arno |
| 2003/0113931 | A1 | 6/2003 | Pan et al. |
| 2003/0138356 | A1 * | 7/2003 | Gilmour ................ G01N 21/78 436/44 |
| 2004/0247484 | A1 | 12/2004 | Yerazunis |
| 2009/0111191 | A1 | 4/2009 | Bonne et al. |
| 2009/0117663 | A1 | 5/2009 | Skarping et al. |
| 2009/0246883 | A1 * | 10/2009 | McBrady et al. ............ 436/164 |

FOREIGN PATENT DOCUMENTS

| | | |
|---|---|---|
| CA | 2767336 | 8/2012 |
| CN | 1419797 A | 5/2003 |
| CN | 101611307 A | 12/2009 |

(Continued)

OTHER PUBLICATIONS

Fisher, R. et al. Image Transforms—Fourier Transform, 2003, retrieved from internet: http://homepages.inf.ed.ac.uk/rbf/HIPR2/fourier.htm.*

(Continued)

*Primary Examiner* — Xiaoyun R Xu
(74) *Attorney, Agent, or Firm* — Wick Phillips Gould & Martin, LLP

(57) ABSTRACT

An apparatus including a treated tape, an adjustable color source, a photodiode, and a processor is provided. The adjustable color source emits a first radiation toward the treated tape and operates at each of a plurality of different target wavelengths in a spectrum. The photodiode measures a second radiation reflected from the treated tape, and the processor analyzes measurements from the photodiode to determine a peak wavelength from the plurality of target wavelengths. Based on the peak wavelength, the processor determines a color and darkness of a color stain on the treated tape. Based on the determined color and darkness of the color stain, the processor also determines a type and concentration of gas to which the treated tape is exposed.

14 Claims, 2 Drawing Sheets

(56) References Cited

FOREIGN PATENT DOCUMENTS

| | | |
|---|---|---|
| CN | 102636442 B | 8/2016 |
| CN | 105928895 | 9/2016 |
| EP | 0 733 901 A2 | 9/1996 |
| EP | 0 733 901 A3 | 12/1996 |
| EP | 2487482 A1 | 8/2012 |
| JP | S53101491 A | 9/1978 |
| JP | 07005110 | 1/1995 |
| JP | 09171011 A | 6/1997 |
| JP | 11128176 | 5/1999 |
| JP | 2000298124 A | 10/2000 |
| JP | 2005257388 A | 9/2005 |
| JP | 2005321349 A | 11/2005 |
| JP | 2005345390 A | 12/2005 |
| JP | 2006071589 A | 3/2006 |
| JP | 200651430 A | 4/2006 |
| JP | 2006250890 A | 9/2006 |
| JP | 2008180742 A | 8/2008 |
| JP | 2008241311 | 10/2008 |
| JP | 2008544212 A | 12/2008 |
| JP | 2009069048 A | 4/2009 |
| JP | 2009243954 A | 10/2009 |
| JP | 6027317 B2 | 11/2016 |
| JP | 2017078713 A | 4/2017 |
| RU | 2012104570 A | 8/2013 |
| TW | 201250233 A | 12/2012 |
| WO | WO 01/10473 A1 | 2/2001 |
| WO | WO 2007/049180 A1 | 3/2007 |

OTHER PUBLICATIONS

DOD Technologies, Inc.—ChemLogic Single Point Detector (CL1), dated Apr. 2008.
European Search Report, dated May 4, 2012, corresponding to Application No. EP 12 15 4132.
Communication pursuant to Article 94(3) EPC, dated May 30, 2012, corresponding to Application No. EP 12 154 132.0.
Office Action for corresponding RU application 2012104570, dated Sep. 9, 2013 (with English translation).
Japan Patent Application No. 2012025136, Office Action, dated Apr. 28, 2015, 8 pages.
Japan Patent Application No. 2012025136, Office Action, dated Jan. 4 2016, 10 pages.
Japan Patent Application No. 2012025136, Notice of Allowance, dated Apr. 28, 2015, 8 pages.
China Patent Application No. 2012100767495, Translation of Office Action and Search Report, dated Apr. 22, 2015, 13 pages.
China Patent Application No. 2012100767495, Office Action, dated Nov. 20, 2015, 3 pages.
China Patent Application No. 201210076749.5, Notification to Grant Patent Right, dated May 11, 2016, 4 pages.
Japan Patent Application No. 2016202459, Notice of Reasons for Rejection, dated Aug. 28, 2017, 4 pages.
Europe Patent Application No. 12 154 132.0, Examination Report, dated Mar. 20, 2017, 5 pages.

* cited by examiner

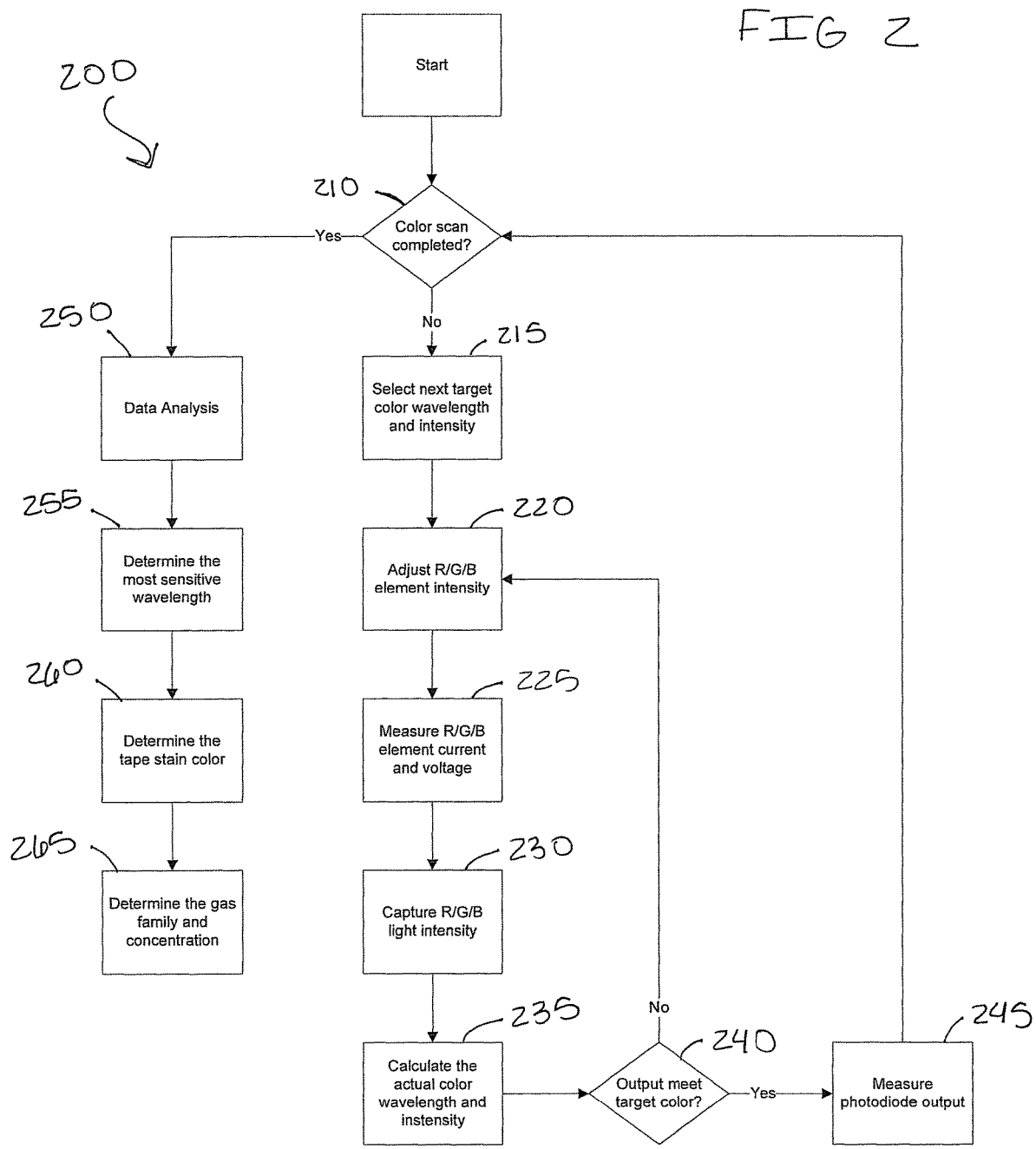

SYSTEMS AND METHODS FOR WAVELENGTH SPECTRUM ANALYSIS FOR DETECTION OF VARIOUS GASES USING A TREATED TAPE

FIELD

The present invention relates generally to gas detection. More particularly, the present invention relates to the detection of multiple types of gases using an adjustable color source and wavelength spectrum analysis.

BACKGROUND

Gas detectors using treated tape to measure gases are known in the art. For example, some gas detectors using treated tape can measure a low concentration gas that comes into contact with the tape.

In known gas detectors, the treated tape can include a chemically treated paper that reacts to a target gas flow delivered by, for example, a sample extraction system inside of the gas detector. The treated tape can react to the gas flow by changing color at the spot where the target gas contacts the tape.

Different types of target gas can cause different color stains on the tape. Similarly, different concentrations of the target gas can alter the color stains on the tape. For example, a higher concentration of target gas can produce a darker stain.

Known gas detectors using treated tape to measure the concentration of gases have incorporated an LED. The LED can have a calibrated intensity and can act as a source of light directed onto the tape. The reflection of light from the tape, and any stains thereon, can be measured by a photodiode. Thus, the darkness of the stain can be measured and the concentration of the target gas can be determined.

Some known gas detectors using treated tape have only employed single wavelength LEDs. Single wavelength LED gas detectors have a high sensitivity to a single stain color caused by one particular type of gas. That is, single wavelength LED gas detectors are highly sensitive to detecting a single type of gas because the wavelength of the LED is calibrated for the particular tape color caused by the one particular type of gas. However, these single wavelength LED gas detectors have a reduced and/or minimal sensitivity to stain colors caused by other types of gas. Thus, single wavelength LED gas detectors have a poor sensitivity for detecting multiple types of gas.

Therefore, there is a continuing, ongoing need for gas detectors that detect multiple types of gases. Preferably, these gas detectors use an adjustable color source and wavelength spectrum analysis.

BRIEF DESCRIPTION OF THE DRAWINGS

FIG. 2 is a flow diagram of a method in accordance with the present invention.

DETAILED DESCRIPTION

Figure 1:
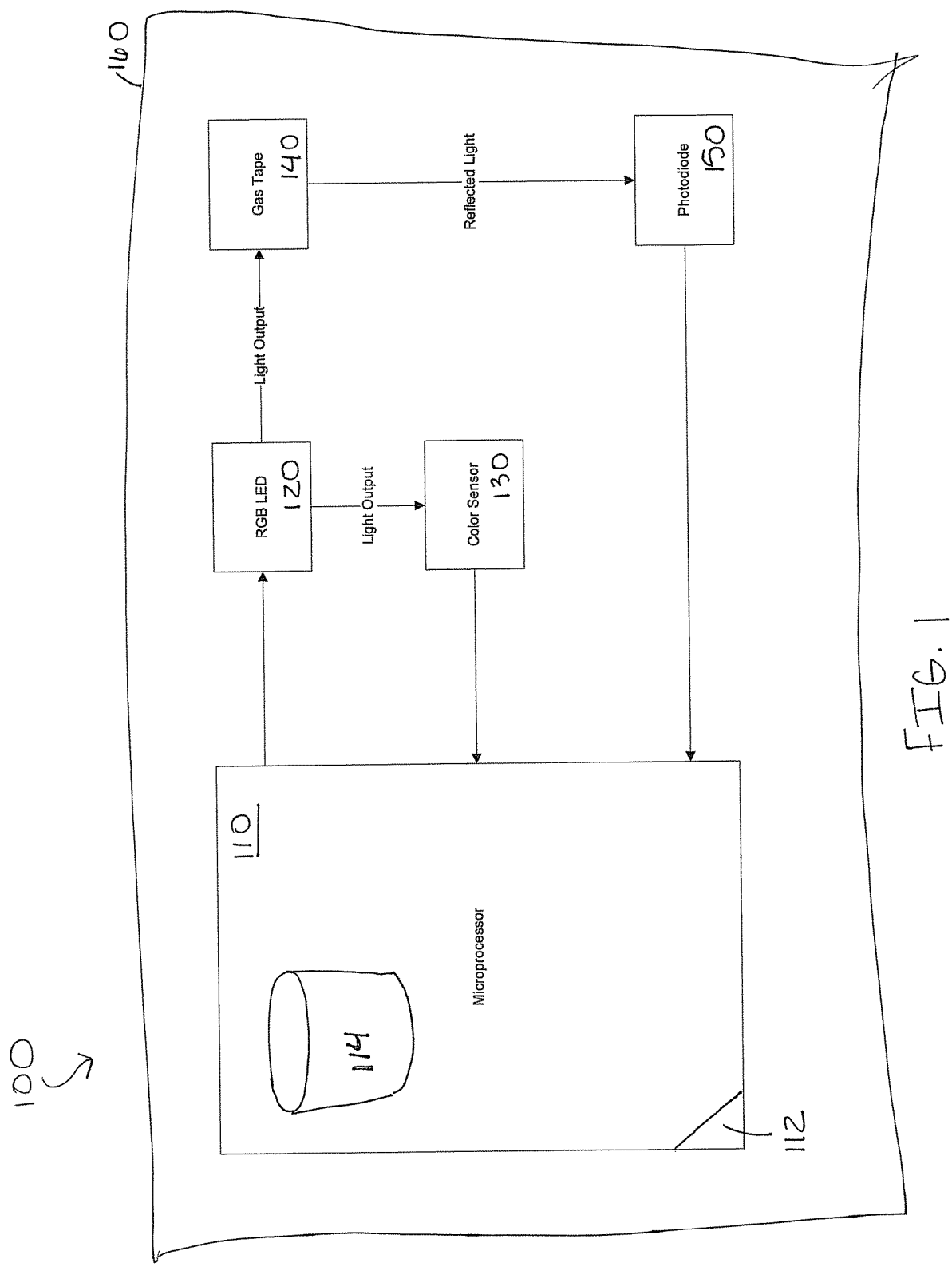
FIG. 1 is a block diagram of a system in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include gas detectors that detect multiple types of gases using an adjustable color source and wavelength spectrum analysis. In embodiments of the present invention, the wavelength and intensity of the adjustable color source be adjusted, and light from the adjustable color source can be directed onto a treated tape. A photodiode can measure a reflection from the treated tape, and a microprocessor can analyze results from the photodiode to determine the type and concentration of gas exposed to the tape.

For example, an adjustable color source in accordance with the present invention can include a RGB (Red-Green-Blue) LED. An adjustable color source in accordance with the present invention can also include a separate Red LED, Green LED, and Blue LED.

The adjustable color source can be controlled by a microprocessor so that the net output radiation from the source is adjusted to a target wavelength. For example, the intensity of each of the Red, Green, and Blue elements in the source can be adjusted to achieve a net output radiation at the target wavelength. In embodiments of the present invention, the microprocessor can control the source to separately or simultaneously output radiation at each of a plurality of target wavelengths in a spectrum.

In embodiments, of the present invention, the wavelength of the source output can be adjusted to target wavelengths along a spectrum, for example, the visible radiation spectrum. In some embodiments, the microprocessor can adjust the wavelength of the adjustable color source from approximately 450 nm to approximately 650 nm. After the wavelength of the source output has been adjusted to each of the target wavelengths along the desired color spectrum, the source completes a color scan.

In accordance with the present invention, radiation from the adjustable color source can act as a source of light and be directed onto a treated tape. A photodiode can measure the reflected radiation from the tape and any stain thereon. In some embodiments, the photodiode can measure the wavelength and intensity of reflected radiation.

The photodiode can measure the reflected radiation while the wavelength of the source is adjusted along the spectrum. Thus, the photodiode can obtain a plurality of measurements corresponding to plurality of source output wavelengths along the spectrum.

When the microprocessor receives measurements from the photodiode, the microprocessor can perform a spectrum scan analysis to determine the color of the stain on the tape as well as the darkness of the color stain. Based on this determination, the microprocessor can determine the type of gas to which the treated tape has been exposed. In some embodiments, the microprocessor can also determine the concentration of the gas to which the tape has been exposed. Accordingly, systems and methods of the present invention can detect the presence of different types of gases without losing sensitivity to any one particular type of gas.

To determine the type of gas to which the treated tape has been exposed, systems and methods of the present invention can determine which source wavelength in the spectrum has the highest sensitivity to the tape and any color stain thereon. In some embodiments, the concentration of the gas to which the tape has been exposed can also be determined by determining which source wavelength has the highest sensitivity.

To determine the source wavelength with the highest sensitivity, systems and methods in accordance with the present invention can perform a data analysis on the measurements from the photodiode. For example, in some embodiments of the present invention, systems and methods can perform a Fast Fourier Transform (FFT) on the measurements from the photodiode in the frequency domain. The result of the FFT can be indicative of the source wavelength with the highest response to the color stain that was caused by gas exposure.

Once the wavelength with the highest sensitivity is determined, systems and methods of the present invention can identify a corresponding color and darkness of the stain on the treated tape. Then, systems and methods of the present invention can determine the type and concentration of gas to which the tape was exposed. For example, systems and methods of the present invention can access a cross-reference table to identify, based on the identified wavelength, the relevant color and darkness of the stain and the relevant type and concentration of the gas that caused the stain.

In embodiments in which the adjustable color source includes a RGB LED, the wavelength of the RGB LED output can be adjusted by controlling the wavelength of each of the Red, Green, and Blue elements. For example, the current flow through each of the Red, Green, and Blue junctions can be adjusted to alter the intensity of each element. The net output of the RGB LED can be altered when the wavelength of the three junctions diffuse.

Systems and methods in accordance with the present invention can verify that the actual output of the adjustable color source is consistent with the target output of the source. That is, systems and methods can verify that the actual wavelength and intensity of radiation emitted by the source are consistent with the target wavelength and intensity output. For example, in some embodiments, the target wavelength output can be compared to the driven current at the LED using an optical parameter stored in the microprocessor. In some embodiments, a color sensor can measure the actual Red, Green, and Blue optical output of the source, and systems and methods can calculate the mixed wavelength and intensity of the source.

In some embodiments, the actual output of the source can be verified by measuring the current and voltage drop for each of the Red, Green, and Blue elements. Then, the radiation actually emitted from the source can be measured, and the wavelength and intensity of the actual source output can be measured.

When the actual output is not consistent with the target output, systems and methods in accordance with the present invention can adjust the intensity of each of the Red, Green, and Blue elements. For example, systems and methods in accordance with the present invention can dim the output of any of the Red, Green, or Blue elements to dim the output of the source.

In some embodiments, the tolerance on the optical performance of the source can be reduced. For example, the temperature at the source can be measured, and the temperature drift on the optical output can be compensated by the microprocessor.

In some embodiments, systems and methods of the present invention can use a white color source in lieu of an adjustable color source. In these embodiments, systems and methods can employ adjustable color detection using, for example, a color filter, or a camera.

FIG. 1 is a block diagram of a system 100 in accordance with the present invention. As seen in FIG. 1, the system 100 can include a microprocessor 110, an adjustable color source 120, a color sensor 130, a treated tape 140, and a photodiode 150. In some embodiments of the present invention, the adjustable color source 120 can include a RGB LED. In some embodiments of the present invention, any or some of the microprocessor 110, adjustable color source 120, color sensor 130, treated tape 140, and photodiode 150 can be housed in a housing 160.

The microprocessor 110 can include executable control software 112 stored on a non-transitory computer readable medium as would be understood by one of ordinary skill in the art. The microprocessor 110 can also include a memory 114. In some embodiments, the memory 114 can be an internal database, and in some embodiments, the memory 114 can be external database that can be accessed by the microprocessor 110.

The microprocessor 110 can control the adjustable color source 120 to adjust the wavelength of the source 120 along a spectrum. That is, the microprocessor 110 can adjust the source 120 so that the source outputs radiation at a plurality of target wavelengths in the spectrum. In some embodiments, the microprocessor 110 can adjust the wavelength of the source 120 within the visible light spectrum. In some embodiments, the microprocessor 110 can output radiation at different wavelengths sequentially or simultaneously.

The color sensor 130 can receive and measure radiation emitted by the source 120. The color sensor 130 can then transmit measurements related to the received radiation to the microprocessor 110, and the microprocessor can determine whether wavelength of the radiation actually output by the source 120 is consistent with the target wavelength of the source. When the target wavelength and the actual output wavelength are not consistent, the microprocessor can adjust the source 120 until consistency is achieved.

The treated tape 140 can be exposed to gas. For example, the treated tape 140 can be exposed to ambient air, or the treated tape can be exposed to air flow delivered by an extraction system. It is to be understood that the method in which the tape 140 is exposed to air and gas is not a limitation of the present invention.

When the treated tape 140 is exposed to air, gases in the air can cause a stain on the tape 140. Different gases can cause different color stains, and different concentrations of gas can cause different levels of stain darkness.

Radiation emitted by the source can be directed onto the treated tape 140, and radiation reflected by the tape 140 can be measured by the photodiode 150. Radiation reflected by any color stains on the tape 140 can also be measured by the photodiode 150. Thus, the photodiode 150 can measure any radiation reflected by the tape 140 and detect any color stains on the tape 140 regardless of stain color or darkness.

Measurements obtained by the photodiode 150 can be transmitted to the microprocessor 110, and the microprocessor 110 can analyze these measurements to determine the type and concentration of gas to which the tape 140 has been exposed.

FIG. 2 is a flow diagram of a method 200 in accordance with the present invention. In embodiments of the present invention, a microprocessor, for example, the microprocessor 110 shown in FIG. 1 can execute the method 200.

The method 200 can determine if a color scan has been completed as in 210. In accordance with the present invention, a color scan is completed when a source has output radiation at each of the target wavelengths within a spectrum.

If the color scan has not been completed, then the next target color wavelength and intensity can be selected as in 215. Then, the R/G/B (Red/Green/Blue) element intensity can be adjusted as in 220 to adjust the output wavelength of the source to the target wavelength and intensity. After these adjustments, the R/G/B element current and voltage can be measured as in 225. The R/G/B light intensity can be captured as in 230, and the actual color wavelength and intensity can be calculated as in 235.

The method 200 can determine if the output color is consistent with the target color as in 240. If not, then the method can again adjust the R/G/B element intensity as in 220, measure the R/G/B element current and voltage as in 225, capture the R/G/B light intensity as in 230, and calculate the actual color wavelength and intensity as in 235.

When the output color is consistent with the target color as determined in 240, the output from the photodiode can be measured as in 245. Then, the method 200 can again determine if the color scan is complete as in 210.

When color scan is complete as determined in 210, the method 200 can perform a data analysis as in 250. The most sensitive wavelength can be determined as in 255, and the stain color on the treated tape can be determined as in 260. Finally, the gas family and the concentration of the gas can be determined, as in 265.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. An apparatus comprising:
a tunable color source configured to emit toward a stain on a treated tape a first radiation at each of a plurality of target wavelengths in a spectrum by sequentially scanning along the target wavelengths, wherein the stain is caused by exposure of the treated tape to a gas;
a color sensor configured to:
receive the first radiation from the tunable color source, and
make a first measurement of the first radiation;
a photodiode configured to:
receive second radiation that is due to reflection of the first radiation from the stain, and
make a second measurement of the second radiation when the tunable color source adjusts its wavelength; and
a processor configured to:
make a comparison of a measured wavelength associated with the first measurement to the target wavelength,
instruct the tunable color source to adjust the wavelength when the comparison indicates that the measured wavelength is not one of the target wavelengths,
determine a peak wavelength and a darkness associated with the second measurement,
determine a type and a family of the gas based on the peak wavelength, and
determine a concentration of the gas based on the darkness.

2. The apparatus of claim 1 wherein the treated tape includes a chemically treated paper.

3. The apparatus of claim 1 wherein the tunable color source includes a red-green-blue (RGB) light-emitting diode (LED).

4. The apparatus of claim 1 wherein the processor is further configured to control the tunable color source to operate at each of the target wavelengths.

5. The apparatus of claim 1 wherein the spectrum includes a visible radiation spectrum.

6. The apparatus of claim 1 wherein the processor is further configured to:
make a comparison of a measured intensity associated with the first measurement to a target intensity, and
instruct the tunable color source to adjust its first radiation when the comparison indicates that the measured intensity is different from the target intensity.

7. The apparatus of claim 1 wherein the processor is further configured to perform a fast Fourier transform (FFT) on the second measurement in order to determine the peak wavelength.

8. The apparatus of claim 7 wherein the peak wavelength corresponds to a wavelength that is most sensitive to the stain.

9. The apparatus of claim 1 wherein the tunable color source is electrically coupled to the processor, optically coupled to the color sensor, and configured to optically couple to the treated tape.

10. The apparatus of claim 9 wherein the color sensor is electrically coupled to the processor.

11. An apparatus comprising:
an adaptable color source configured to emit toward a stain on a treated tape a first radiation at each of a plurality of target wavelengths in a spectrum by sequentially scanning along the target wavelengths, wherein the stain is caused by exposure of the treated tape to a gas;
a color sensor configured to:
receive the first radiation from the adaptable color source, and
make a first measurement of the first radiation;
a photodiode configured to:
receive, simultaneously with the adaptable color source adjusting its wavelength, second radiation that is due to reflection of the first radiation from the stain, and
make, simultaneously with the adaptable source adjusting the wavelength, a second measurement of the second radiation; and
a processor configured to:
make a comparison of a measured wavelength associated with the first measurement to the target wavelength,
instruct the adaptable color source to adjust the wavelength when the comparison indicates that the measured wavelength is not one of the target wavelengths,
determine a peak wavelength and a darkness associated with the second measurement,
determine a type and a family of the gas based on the peak wavelength, and
determine a concentration of the gas based on the darkness.

12. The apparatus of claim 3, wherein the processor is further configured to instruct the adaptable color source to adjust intensities of its red element, green element, and blue element when the comparison indicates that the measured wavelength is not one of the target wavelengths.

13. The apparatus of claim 5, wherein the spectrum is between 450 nanometers (nm) and 650 nm.

14. The apparatus of claim 10, wherein the photodiode is electrically coupled to the processor and configured to optically couple to the treated tape.

* * * * *